Oct. 31, 1961   L. E. PONSY   3,007,066
TRANSMISSION UNITS COMPRISING EDDY CURRENT COUPLINGS
Filed June 19, 1958   3 Sheets-Sheet 1
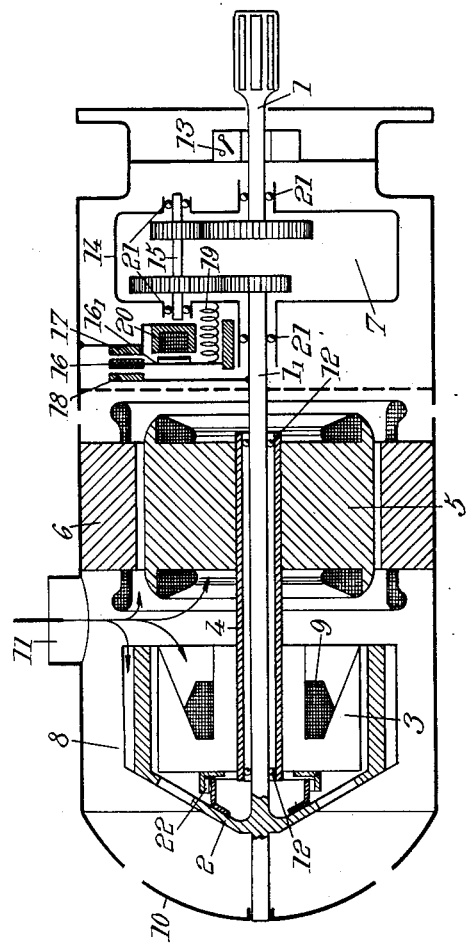
INVENTOR
LOUIS EMILE PONSY
ATTORNEY

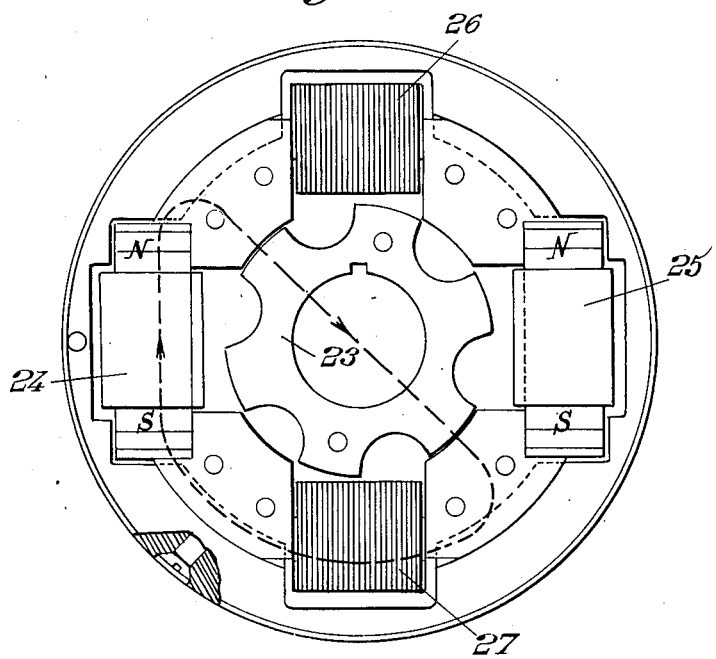
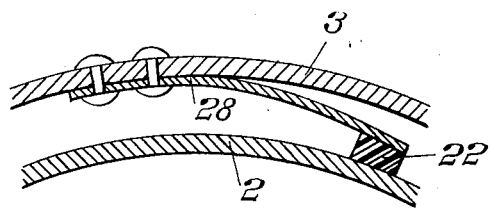

Oct. 31, 1961 L. E. PONSY 3,007,066
TRANSMISSION UNITS COMPRISING EDDY CURRENT COUPLINGS
Filed June 19, 1958 3 Sheets-Sheet 3

INVENTOR
LOUIS EMILE PONSY

ATTORNEY

United States Patent Office 3,007,066
Patented Oct. 31, 1961

---

3,007,066
TRANSMISSION UNITS COMPRISING EDDY CURRENT COUPLINGS
Louis Emile Ponsy, Montmorency, France, assignor to Precision Mecanique Labinal, Saint-Ouen (Seine), France, a French society
Filed June 19, 1958, Ser. No. 743,103
Claims priority, application France June 19, 1957
4 Claims. (Cl. 310—96)

The present invention relates to transmission units comprising eddy currents couplings and more particularly to such units for use between an inlet shaft rotating at a widely variable speed, and a machine to be driven at a substantially constant speed, as for instance an A.C. generator or alternator, such as the alternators which are used on aircraft and the like to supply constant frequency electric current to electrical apparatus such as radars and the like, the input shaft then being driven by a turbine or by the jet engine of the aircraft.

In accordance with this invention the eddy currents coupling, the exciting current of which is automatically controlled in accordance with the frequency of the alternator to maintain same substantially constant, comprises an inductor member and an armature member disposed at one end of the transmission unit and preferably supported by co-axial shafts.

According to a further characteristic feature of this invention a change speed gear is interposed between the input shaft and the driven apparatus to provide a wider possible variation of the speed of the input shaft without an excessive slip between both members of the eddy current coupling, the said change speed gear being preferably controlled automatically in accordance with the speed of the input shaft.

The eddy currents coupling is preferably so arranged that, above a minimum slip, the torque transmitted to the driven member of the coupling is substantially independent of the relative speeds of both members of the coupling and is only determined by the intensity of the exciting current in the inductor windings of the coupling. For this purpose the armature member of the coupling may comprise elements made of a highly conducting metal such as copper, the said elements being of appropriate shape, as for instance ring-shaped. Under such conditions the torque transmitted by the coupling to the rotor of the alternator will be dependent upon the exciting current supplied to the coupling, whatever may be the speed of the input shaft (of course above a given minimum speed) and any increase of this speed will only result in an increase of the quantity of heat generated in the armature of the coupling.

In the annexed drawings:

FIG. 1 is a diagrammatical longitudinal section of a transmission unit comprising an eddy currents coupling and an alternator in accordance with this invention.

FIG. 2 is a diagrammatical transverse section of a homopolar A.C. generator adapted to control the change speed gear illustrated in FIG. 1.

FIG. 3 is an enlarged fragmental transverse section of FIG. 1, illustrating the frictional clutch adapted to start the alternator.

Figure 4:
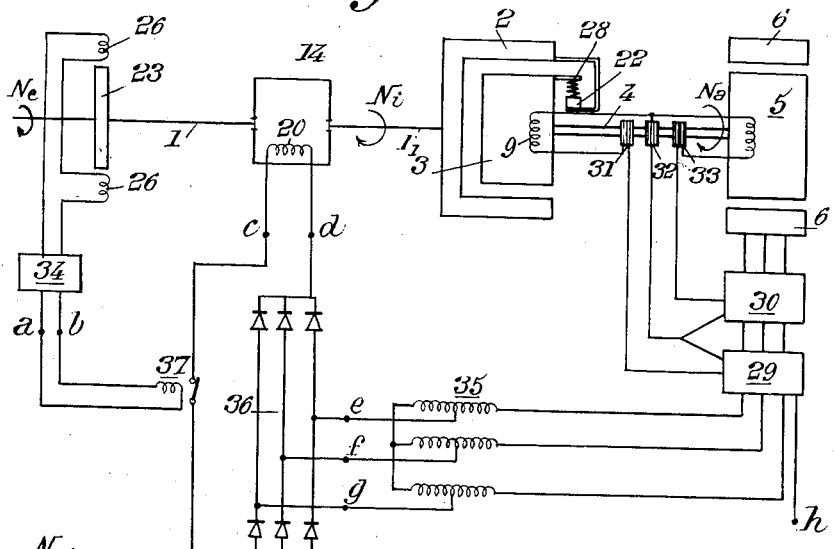
FIG. 4 is a general diagram of the electric apparatus and connections associated to the unit illustrated in FIG. 1.

In FIG. 1 reference numeral 1 designates an input shaft rotating at a widely variable speed, 2 and 3 being respectively the driving and the driven member of an eddy current coupling adapted to provide a controlled slip between both members. Reference numeral 4 designates the shaft to be driven at a constant speed, while 5 and 6 are respectively the rotor and the stator of the alternator mounted on shaft 4.

It is to be noted that in the embodiment described, the coupling device is disposed at one end of the apparatus, namely at the other end with respect to the driving gearings of the unit.

The general arrangement illustrated is of particular advantage since it permits of easily dissipating the heat developed in the armature member 2 of the eddy current coupling, for instance by air circulation. This may be achieved with a relatively reduced air flow and with relatively high air temperatures (as for instance about 200° C.), which may be of interest more particularly in the case of supersonic aircraft, wherein the air impact temperature is high owing to kinetic heating phenomena.

The armature member 2 of the coupling is not directly carried by the input shaft 1, but it is mounted on an intermediate shaft $1_1$ which is driven by input shaft 1 through a change-speed gear as hereinafter explained. Said member 2 is in the form of a soft iron cylinder provided with outer cooling fins 8 and with appropriate copper rings (not illustrated) adapted to ensure an approximately horizontal torque-relative speed characteristic, for the purpose above set forth.

The inductor member 3 of the electromagnetic coupling may be of any known type, as for instance with staggered poles, as illustrated, or with radial poles. It is mounted on the hollow shaft 4 which carries the rotor 5 of the alternator and it is adapted to develop eddy currents in the armature member 2. There is thus realized an electromagnetic coupling between armature member 2 and inductor member 3, the slip of this coupling being dependent of the exciting current in the inductor winding 9.

The alternator 5, 6 illustrated is of the conventional synchronous type with salient poles, but it could be of any other type as for instance asynchronous, homopolar, etc. It is disposed within the casing 10 which encloses the coupling 2, 3. It is preferably cooled by air circulation, the cooling air being admitted through an inlet nozzle 11 which is common to the alternator and to the electromagnetic coupling device. Alternatively the alternator could be water-cooled.

As aforesaid the shaft 4 which carries the inductor member 3 of the coupling and the rotor 5 of the alternator is hollow and preferably tubular, and it is loosely mounted on the intermediate shaft $1_1$ which carries the armature member 2 of the electromagnetic coupling, as for instance by means of ball bearings 12 interposed between both shafts (or alternatively between shaft 4 and any member such as 2 carried by shaft $1_1$).

The ends of the inner intermediate shaft $1_1$ are also carried by appropriate bearings supported by casing 10, which avoids any overhung member on both shafts $1_1$ and 4, this being an interesting advantage of the construction described.

Another advantage results from the mounting on one and the same shaft 4 of both inductors 3 and 5 (respectively of the electromagnetic coupling and of the alternator). This permits of using the same slip rings to supply exciting current to both inductors.

The arrangement described permits of driving an alternator having a frequency of 400 cycles at 6,000 r.p.m. by means of a driving shaft the speed of which varies between 7,000 and 10,000 r.p.m.

In order to permit wider variations of the speed of the input shaft 1 without an excessive heating of armature member 2 under the action of slip, it is convenient to dispose between the latter and the driving member 2 of the electromagnetic coupling a change speed gear 7 adapted to ensure a variable speed ratio between shafts 1 and $1_1$. Supposing for instance that this change speed gear provides two speed ratios such as 1/1 and 2/1, alternator 5, 6 may be driven at its nominal speed of 6,000 r.p.m. with the input speed varying between 3,500 and 10,000 r.p.m.

The change speed gear 7 is automatically actuated by an electric switch 13 which is itself operated as soon as the speed of input shaft 1 exceeds a predetermined limit (about 6,500 to 6,800 r.p.m. in the aforesaid example).

In the embodiment illustrated the change-speed gear 7 comprises a planetary gearing, with a planet gear carrier 14 and planet gears 15, and a two-way friction clutch 16 which connects the planet gear carrier 14 either with a fixed plate 17 solid with casing 10 (first speed: ratio 2/1 expressed as outlet speed/input speed) or with a plate 18 keyed on shaft $1_1$ (second speed or direct drive: ratio 1/1).

Clutch 16 comprises friction surfaces mounted at the end of flexible blades $16_1$ whereby the said surfaces may move axially without any friction, in a progressive manner and while being well centered. These friction surfaces are subjected to the action of spring means 19. Under the action of these means the friction member 16 of the clutch engages plate 18, but under the action of an electromagnet the coil of which is referenced 20, member 16 may be brought into engagement with plate 17. When coil 20 is energized, which preferably occurs at low speeds of input shaft 1, as hereinafter explained, the planet carrier 14 is stationary and the speed ratio is therefore 2/1, while when the said coil is unenergized this ratio becomes equal to 1/1 (direct drive).

This arrangement affords the following advantages: The eddy currents which may appear in blades $16_1$ are reduced to a minimum, and the direct drive is used at the higher speeds of the input shaft, i.e. under normal flying conditions in the case of an aircraft; in the case of a supersonic aircraft the gears are thus inoperative when the temperature which prevails in the craft is high.

It is to be noted that in the zone of the higher speeds, when the slip is at a maximum, the cooling air flow is also at a maximum, while in the case of the lower speeds when the cooling air flow is reduced, the slip is at a minimum. Excessive temperature variations are thus avoided.

Appropriate roller bearings 21 are provided to rotatably support planet gears 15 in carrier 14 and carrier 14 itself on shafts 1 and $1_1$, these bearings being so arranged as to support axial and radial reactions resulting from operation of the change speed gear 7.

This change speed gear 7 could be arranged to provide more than two speed ratios, as for instance three, to permit wider possible variations of the input shaft speed. It could be directly actuated by centrifugal action, as for instance by means of centrifugal weights.

The speed responsive switch 13 could be formed of a magnet attached to a flexible blade and adapted to act on the actuating button of a conventional micro-switch, the said magnet being itself electromagnetically influenced by a soft iron disc carried by shaft 1, whereby the micro-switch would be operated for a given speed of shaft 1. Since there exists a difference between the pressures required to close a micro-switch and thereafter to permit opening of the latter, any unstable operation of the device in the speed zone corresponding to the automatic change would be wholly avoided.

Switch 13 could also be in the form of a conventional centrifugal switch, or of a magnetic impulse detector (such impulses being for instance generated by a homopolar alternating current generator with a toothed disc carried by shaft 1, and being thereafter detected by means of an appropriate electric filter circuit), or further of a relay operated by the voltage developed by a tachometric or speed-responsive dynamo.

But in the preferred embodiment switch 13 is formed of a flux-switch speed detector. Such a detector comprises for instance an alternating current generator having a rotor 23 (FIG. 2) formed of a star-shaped laminated core with six salient poles, and a stator embodying two permanent magnets 24 and 25 and two coils 26 and 27. The magnetic flux developed by each magnet 24 or 25 passes successively through coil 26 and through coil 27 according to the position of the six pole rotor with respect to the four pole stator and it is easy to see that each coil, such as 27 for instance, receives successively the magnetic flux of magnet 24 in one direction (right to left, as shown) and the magnetic flux of magnet 25 in the other direction. Such a generator develops an alternating voltage the frequency of which is proportional to the speed of rotor 23. This voltage is applied to an electric filtering circuit which only permits passage of an actuating current when the speed exceeds a predetermined value.

When the winding 9 of the inductor member 3 of the electromagnetic coupling is supplied with electric current by the alternator 5, 6 itself, there would normally exist no coupling torque when starting and therefore the alternator would never rotate. This may be avoided by providing between coupling members 2 and 3 an auxiliary clutch adapted to operate at low rotational speed and to become ineffective as soon as the speed exceeds the limit corresponding to operation of alternator 5, 6, the connection between members 2 and 3 then being ensured by the electromagnetic coupling.

The aforesaid auxiliary clutch could operate by residual magnetism, but in the preferred embodiment of this invention it is in the form of a centrifugal frictional clutch comprising a shoe 22 (FIGS. 1 and 3) carried by a spring blade 28 attached to the inductor member 3, the said shoe being pressed by blade 28 against an inner drum secured to the armature member 2. As soon as the centrifugal force acting on shoe 22 exceeds the action of blade 28, shoe 22 is raised and the connection is only ensured by the electromagnetic forces, the speed of shaft 4 then being such that the alternator 5, 6 is excited and that therefore the winding 9 of inductor member 3 is itself energized.

The electric operation will now be described with reference to FIGS. 4 and 6.

In the diagram of FIG. 4 the main parts of the apparatus have been very diagrammatically illustrated with the same reference numerals as in FIG. 1. 29 designates the frequency regulator which controls the exciting current supplied to the inductor winding 9 in accordance with the frequency of the alternator. This regulator is preferably of the kind described in my prior U.S. application Serial No. 630,826, filed February 12, 1957, the frequency thus being maintained constant with a precision higher than 1%.

A voltage regulator 30 is disposed on the terminals of the alternator. Reference numerals 31, 32 and 33 designate the slip rings mounted on the alternator shaft 4, ring 32 being used as a common return conductor for the inductor 3 of the electromagnetic coupling and for the rotor 5 of the alternator. 34 is the filtering circuit which forms a part of the speed detector.

Figure 6:
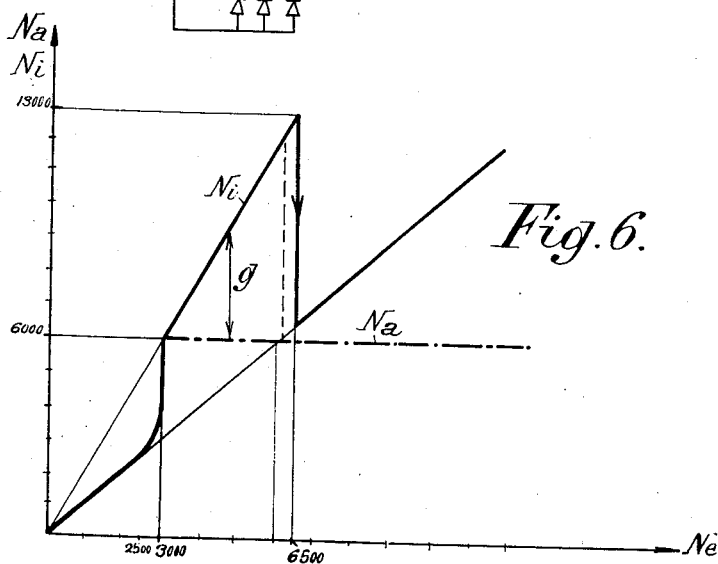
FIG. 6 illustrates the representative curve of the operation of the unit.

In FIG. 6 the abscissae correspond to the speed Ne of the input shaft 1 expressed in r.p.m., while the ordinates represent, also expressed in r.p.m., the speed Ni of the intermediate shaft $1_1$ and the speed Na of the rotor of the alternator.

The operation is as follows:

When the apparatus is started, the alternator is unexcited and therefore generates no current. The clutch actuating coil 20 is therefore unenergized. The speed ratio between input shaft 1 and intermediate shaft $1_1$ is equal to 1/1. The frictional connection ensured by shoe 22 and blade 28 between members 2 and 3 is practically without slip and therefore $Ne=Ni=Na$.

When Ne exceeds 2,500 r.p.m. the alternator begins to operate. This has two results:

(1) Electric current is now supplied to the inductor winding 9 through the frequency regulator 29 and therefore the electromagnetic coupling 2, 3 is ready to operate as the frictional clutch 22, 28 (FIG. 3) is progressively rendered ineffective by centrifugal force.

(2) Electric current is also supplied to the coil 20 of the clutch element of the change speed gear 7, through autotransformer 35, three-phase rectifier 36 and the switch contact of relay 37, the coil of which is still unenergized. The planet carrier 14 is therefore braked and the speed ration between shafts 1 and $1_1$ becomes equal to 2/1 whereby N$i$ becomes equal to 2N$e$. Consequently N$a$=2N$e$—$g$, $g$ being the slight speed difference resulting from slip between members 2 and 3.

As soon as N$e$ exceeds 3,000 r.p.m., N$a$ becomes equal to 6,000 r.p.m., i.e. to the nominal operating speed of the alternator. The frequency regulator 29 then becomes effective and it controls current supplied to winding 9 (i.e. the slip or speed difference $g$) in such a manner that N$a$ remains equal to 6,000 r.p.m. notwithstanding the increase of the input speed N$e$ or the variations of the load applied to the alternator.

It will be supposed that the filtering circuit 34 only permits passage of electric current from the tachometric generator 23, 26 when the speed of shaft 1 exceeds 6,500 r.p.m. as long as N$e$ is lower than 6,500 r.p.m. the coil of relay 34 is therefore unenergized, the switch contact of the said relay remains at the closed position and coil 20 remains operative. But as soon as the input speed N$e$ reaches 6,500 r.p.m., electric current will be supplied to the coil of relay 37 and therefore the circuit of coil 20 will open, whereby the speed ratio between shafts 1 and $1_1$ will again become 1/1.

FIG. 6 clearly shows that the slip $g$ which corresponds to the speed difference between the variable speed N$i$ and the constant speed N$a$ (which is lower than N$i$) is considerably reduced by the presence of the change speed gear. In other words change speed gear 7 permits doubling of the possible variation of the input speed for the same maximum slip.

When the input shaft speed decreases, the same operating cycle takes place in the reverse direction, but with a slight displacement of the point corresponding to the automatic actuation of the change speed gear, owing to the difference between the current required in the coil of relay 37 to actuate same (when the input speed is increasing) and the current for which the movable armature of the relay is returned to its position of rest (when the input speed is decreasing). This kind of hysteresis, which is indicated by the dash line in FIG. 6, is an advantage since it avoids any intermittent or unstable operation under the effect of smaller load variations when the input speed is in the vicinity of the value corresponding to the automatic actuation of the change speed gear.

Figure 5:
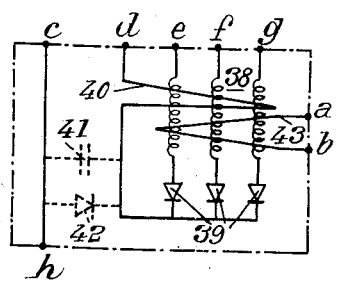
FIG. 5 shows a modification of the diagram of FIG. 4.

FIG. 5 illustrates a possible modification of the portions 36 and 37 of the diagram of FIG. 4, such modification dispensing with any kind of relay or like apparatus embodying a movable part.

Reference numerals $a$, $b$, $c$, $d$, $e$, $f$, $g$, $h$ indicate in FIG. 4 the points of the diagram which should be connected with the corresponding points of FIG. 5, rectifier 36 and relay 37 being of course removed. In this modification rectifier 36 and relay 37 are replaced by a three-phase self-saturated magnetic amplifier 38 and by a rectifier 39. The magnetic amplifier has two stable regimes owing to the presence of a positive feed back (coil 40). A condenser 41 or a rectifier cell 42 is connected across the clutch coil 20 of change speed gear 7 (points $c$, $d$) to ensure proper operation of the amplifier with the inductive load of coil 20. Reference numeral 43 designates the operating winding connected to the filtering network 34. When substantially no current flows through this winding the amplifier is saturated and a positive voltage is generated between $c$ and $d$ (i.e. at the terminals of coil 20). This occurs when N$e$<6,500 r.p.m. Coil 20 is then energized and the transmission ratio between shafts 1 and $1_1$ is equal to 2/1 (or more exactly N$i$/N$e$=2).

When N$e$≧6,500 r.p.m. current begins to flow through winding 43, and the magnetic amplifier works in conditions corresponding to its second regime. The full A.C. voltage appears at the terminals of the amplifier windings and only a very small D.C. voltage exists between $c$ and $d$. The clutch coil is practically unenergized and the change speed gear is returned to the speed ratio 1/1.

The apparatus of FIG. 5 operates as in the embodiment of FIG. 4 but it has this advantage that it is wholly static.

I claim:

1. An alternating current generator unit comprising an input shaft adapted to be rotated at a variable speed; a two-speed gear driven by said input shaft, said two-speed gear embodying a spring-pressed two-way clutch and an electromagnet to actuate said clutch, said clutch ensuring the higher transmission ratio when said electromagnet is unenergized and the lower transmission ratio when said electromagnet is energized; an intermediate shaft driven by said two-speed gear; an eddy current coupling embodying an armature member carried by said intermediate shaft and an inductor member electromagnetically driven by said armature member, said inductor member having exciting coil means; a driven shaft to carry said inductor member; an alternator embodying a stator and a rotor, said rotor being carried by said driven shaft; means responsive to the load on the driven shaft and to the frequency of said alternator to control current supply to the coil means of said inductor member to maintain said frequency substantially constant; and static means responsive to the speed of said input shaft to supply exciting current to the actuating electromagnet of said two-way clutch when the speed of said input shaft exceeds a predetermined value.

2. An alternating current generator unit comprising an input shaft adapted to be rotated at a variable speed, a two-speed gear driven by said input shaft, said two-speed gear embodying a spring-pressed two-way clutch and an electromagnet to actuate said clutch, said clutch ensuring the higher transmission ratio when said electromagnet is unenergized and the lower transmission ratio when said electromagnet is energized, an intermediate shaft driven by said two-speed gear, an eddy current coupling embodying an armature member carried by said intermediate shaft and an inductor member electromagnetically driven by said armature member, said inductor member having exciting coil means, a driven shaft to carry said inductor member, an alternator embodying a stator and a rotor, said rotor being carried by said driven shaft, means responsive to the load on the driven shaft and to the frequency of said alternator to control current supply to the coil means of said inductor member to maintain said frequency substantially constant, static means responsive to the speed of said input shaft to supply exciting current to the actuating electromagnet of said two-way clutch when the speed of said input shaft exceeds a predetermined value, said static means responsive to the speed of said input shaft comprising an auto-transformer to which current is supplied from said alternator, a saturated magnetic amplifier energized by said auto-transformer, the outlet of said amplifier being connected with the actuating electromagnet of said two-way clutch to energize same, a positive feed-back winding inserted in series with said electromagnet, and an operating winding to act on said magnetic amplifier, said operating winding being energized as a function of the speed of said input shaft.

3. An alternating current generator unit according to claim 1 in which said static means responsive to the speed of said input shaft are in the form of a speed detector flux switch.

4. An alternating current generator unit according to claim 2 in which said static means responsive to the speed of said input shaft are in the form of a speed detector flux switch.

References Cited in the file of this patent

UNITED STATES PATENTS

| | | |
|---|---|---|
| 2,193,837 | Winther | Mar. 19, 1940 |
| 2,286,778 | Winther | June 16, 1942 |
| 2,449,905 | Lotts | Sept. 21, 1948 |
| 2,883,611 | Fuge | Apr. 21, 1959 |
| 2,900,594 | Bessiere | Aug. 18, 1959 |

FOREIGN PATENTS

| | | |
|---|---|---|
| 553,192 | Great Britain | May 11, 1943 |
| 682,110 | Germany | Oct. 7, 1939 |